(12) United States Patent
Li

(10) Patent No.: US 9,122,316 B2
(45) Date of Patent: Sep. 1, 2015

(54) ENABLING DATA ENTRY BASED ON DIFFERENTIATED INPUT OBJECTS

(71) Applicant: Dong Ge Li, Hoffman Estates, IL (US)

(72) Inventor: Dong Ge Li, Hoffman Estates, IL (US)

(73) Assignee: Zienon, LLC, Rolling Meadows, IL (US)

( * ) Notice: Subject to any disclaimer, the term of this patent is extended or adjusted under 35 U.S.C. 154(b) by 0 days.

(21) Appl. No.: 14/031,412

(22) Filed: Sep. 19, 2013

(65) Prior Publication Data

US 2014/0015757 A1 Jan. 16, 2014

Related U.S. Application Data

(63) Continuation of application No. 12/787,805, filed on May 26, 2010, now abandoned, and a continuation-in-part of application No. 11/361,858, filed on Feb. 23, 2006. Provisional application (Continued)

(51) Int. Cl.
*G06F 3/023* (2006.01)
*G06F 3/038* (2013.01)
*G06F 3/041* (2006.01)
*G06F 3/042* (2006.01)

(52) U.S. Cl.
CPC .............. *G06F 3/023* (2013.01); *G06F 3/038* (2013.01); *G06F 3/0418* (2013.01); *G06F 3/0426* (2013.01)

(58) Field of Classification Search
CPC ....... G06F 3/023; G06F 6/038; G06F 3/0426; G06F 3/0418
USPC ............................ 345/168–178; 715/773, 863
See application file for complete search history.

(56) References Cited

U.S. PATENT DOCUMENTS

| 4,988,981 A | 1/1991 | Zimmerman et al. |
| 5,025,705 A | 6/1991 | Raskin |
| 5,168,531 A | 12/1992 | Sigel |

(Continued)

FOREIGN PATENT DOCUMENTS

| EP | 0489792 | 3/1994 |
| WO | WO96/02394 | 2/1996 |

(Continued)

OTHER PUBLICATIONS

MacKenzi, I.S., & Soukoreff, R.W. (2002); Text Entry for Mobile Computing: Model and Methods, Theory and Practice. Human Computer Interaction, 17, 147-198.

(Continued)

*Primary Examiner* — Liliana Cerullo
(74) *Attorney, Agent, or Firm* — Joseph A. Fuchs; Nixon Peabody LLP

(57) ABSTRACT

Methods and apparatus for facilitating virtual input in devices that differentiates input objects are provided. Various methods for automatically configuring component settings and features of such devices are described. Changes in the component settings of the device and the corresponding operational characteristics of the device that triggered said changes may be grouped into profiles and selected by users. The component settings may include useful assisting features such as additional lighting provide by a LED and illuminated visual guides of the virtual input interface projected by a laser or LED. The characteristics of such assisting features may be modified dynamically in response to changes in the state of a reference object.

42 Claims, 5 Drawing Sheets

Related U.S. Application Data

(60) No. 61/216,993, filed on May 26, 2009, provisional application No. 61/217,649, filed on Jun. 3, 2009, provisional application No. 60/655,469, filed on Feb. 23, 2005.

(56) References Cited

U.S. PATENT DOCUMENTS

| | | | |
|---|---|---|---|
| 5,245,559 | A | 9/1993 | Lapeyre |
| 5,581,484 | A | 12/1996 | Prince |
| 5,767,842 | A | 6/1998 | Korth |
| 5,790,103 | A | 8/1998 | Willner |
| 5,793,312 | A | 8/1998 | Tsubai |
| 5,825,352 | A | 10/1998 | Bisset et al. |
| 5,841,374 | A | 11/1998 | Abraham |
| 5,973,621 | A | 10/1999 | Levy |
| 5,982,302 | A | 11/1999 | Ure |
| 6,011,554 | A | 1/2000 | King et al. |
| 6,087,577 | A | 7/2000 | Yahata et al. |
| 6,102,594 | A | 8/2000 | Strom |
| 6,204,848 | B1 | 3/2001 | Nowlan et al. |
| 6,208,330 | B1 | 3/2001 | Hasegawa et al. |
| 6,232,960 | B1 | 5/2001 | Goldman |
| 6,307,549 | B1 | 10/2001 | King et al. |
| 6,348,878 | B1 | 2/2002 | Tsubai |
| 6,356,258 | B1 | 3/2002 | Kato et al. |
| 6,407,679 | B1 | 6/2002 | Evans et al. |
| 6,512,838 | B1 | 1/2003 | Rafii et al. |
| 6,542,091 | B1 | 4/2003 | Rasanen |
| 6,593,914 | B1 | 7/2003 | Nuovo et al. |
| 6,611,252 | B1 | 8/2003 | DuFaux |
| 6,611,253 | B1 | 8/2003 | Cohen |
| 6,614,422 | B1 | 9/2003 | Rafii et al. |
| 6,654,484 | B2 | 11/2003 | Topping |
| 6,670,894 | B2 | 12/2003 | Mehring |
| 6,690,618 | B2 | 2/2004 | Tomasi et al. |
| 6,710,770 | B2 | 3/2004 | Tomasi et al. |
| 6,885,317 | B1 | 4/2005 | Gutowitz |
| 7,016,711 | B2 | 3/2006 | Kurakane |
| 7,020,270 | B1 | 3/2006 | Ghassabian |
| 7,088,340 | B2 | 8/2006 | Kato |
| 7,151,530 | B2 | 12/2006 | Roeber et al. |
| 7,199,786 | B2 | 4/2007 | Suraqui |
| 7,439,957 | B2 | 10/2008 | Chu et al. |
| 7,530,031 | B2 | 5/2009 | Iwamura et al. |
| 7,555,732 | B2 | 6/2009 | Van der Hoeven |
| 7,725,511 | B2 | 5/2010 | Kadi |
| RE43,082 | E | 1/2012 | Gutowitz |
| 2002/0021287 | A1 | 2/2002 | Tomasi et al. |
| 2002/0140582 | A1 | 10/2002 | Ye |
| 2002/0163506 | A1 | 11/2002 | Matusis |
| 2002/0171633 | A1 | 11/2002 | Brinjes |
| 2002/0180698 | A1 | 12/2002 | Kaelbling |
| 2003/0043118 | A1 | 3/2003 | Lee |
| 2003/0048260 | A1 | 3/2003 | Matusis |
| 2003/0063775 | A1 | 4/2003 | Rafii et al. |
| 2003/0179185 | A1 | 9/2003 | Iwamura et al. |
| 2004/0032398 | A1 | 2/2004 | Ariel et al. |
| 2004/0046744 | A1 | 3/2004 | Rafii et al. |
| 2004/0169635 | A1 | 9/2004 | Ghassabian |
| 2004/0179001 | A1 | 9/2004 | Morrison et al. |
| 2004/0196268 | A1 | 10/2004 | Hsu et al. |
| 2004/0242988 | A1 | 12/2004 | Niwa et al. |
| 2004/0263473 | A1 | 12/2004 | Cho et al. |
| 2005/0024338 | A1 | 2/2005 | Ye |
| 2005/0162402 | A1* | 7/2005 | Watanachote ............... 345/173 |
| 2005/0225538 | A1 | 10/2005 | Verhaegh |
| 2005/0253814 | A1 | 11/2005 | Ghassabian |
| 2006/0028358 | A1 | 2/2006 | Bollman |
| 2006/0028450 | A1 | 2/2006 | Suraqui |
| 2006/0114233 | A1 | 6/2006 | Radivojevic et al. |
| 2006/0132447 | A1 | 6/2006 | Conrad |
| 2006/0190836 | A1 | 8/2006 | Ling Su et al. |
| 2006/0282791 | A1 | 12/2006 | Bogomolov et al. |
| 2007/0035521 | A1 | 2/2007 | Jui et al. |
| 2008/0300010 | A1 | 12/2008 | Border et al. |
| 2009/0183098 | A1 | 7/2009 | Casparian et al. |
| 2009/0237361 | A1* | 9/2009 | Mosby et al. ............... 345/173 |
| 2010/0231522 | A1 | 9/2010 | Li |

FOREIGN PATENT DOCUMENTS

| | | |
|---|---|---|
| WO | WO01/59558 | 8/2001 |
| WO | WO01/59975 | 8/2001 |
| WO | WO02/10896 | 2/2002 |
| WO | WO03/046706 | 6/2003 |
| WO | WO03/050795 | 6/2003 |
| WO | WO2009/059479 | 5/2009 |

OTHER PUBLICATIONS

Roos, Gina, Fingerprint Sensor Touts Security, Navigation, and Personalization for Cell Phones Nov. 2004.

* cited by examiner

ENABLING DATA ENTRY BASED ON DIFFERENTIATED INPUT OBJECTS

RELATED U.S. APPLICATION DATA

This application is a continuation of U.S. Ser. No. 12/787,805 filed May 26, 2010, which claims priority from U.S. provisional patent application Ser. No. 61/216,993 filed May 26, 2009, and Ser. No. 61/217,649 filed Jun. 3, 2009, and is a continuation-in-part of U.S. Ser. No. 11/361,858 filed Feb. 23, 2006, which claims priority from U.S. provisional patent application Ser. No. 60/655,469 filed Feb. 23, 2005, which are fully incorporated herein by reference.

The invention described herein was made, in part, in the course of work supported by National Science Foundation Grant IIP-0924574.

FIELD OF THE INVENTION

The present invention relates in general to the field of data entry, and in particular, to methods and apparatus for user input in a virtual device.

BACKGROUND OF THE INVENTION

The Tapping Finger Identification (TFI) technology disclosed in U.S. patent application Ser. No. 11/361,858 by Ling Su et al. enables a new type of data entry solution by differentiating an input object from a group of candidate input objects. For example, TFI-enabled keyboards determine user input not only based on which key was pressed, but also on which of the user's fingers was used to press the key, as each key may be capable of selecting multiple symbols or functions. When provided with a virtual interface, TFI-enabled systems permit users to touch type or perform multi-touch input on invisible devices on a work surface or even "in the air".

While fingers, as an obvious example to facilitate understanding, are frequently used in the discussion, it is worth noting that other types of input objects may also be used.

BRIEF DESCRIPTION OF THE DRAWINGS

The accompanying figures, wherein like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION

Data entry based on differentiated input objects, such as a user's fingers while typing, as disclosed in U.S. patent application Ser. No. 11/361,858 by Ling Su et al., finds numerous applications that include virtual keyboard, virtual multi-touch input, gaming, etc. Methods and apparatus for enabling systems and applications incorporating such data entry methods are provided herein.

Figure 6:
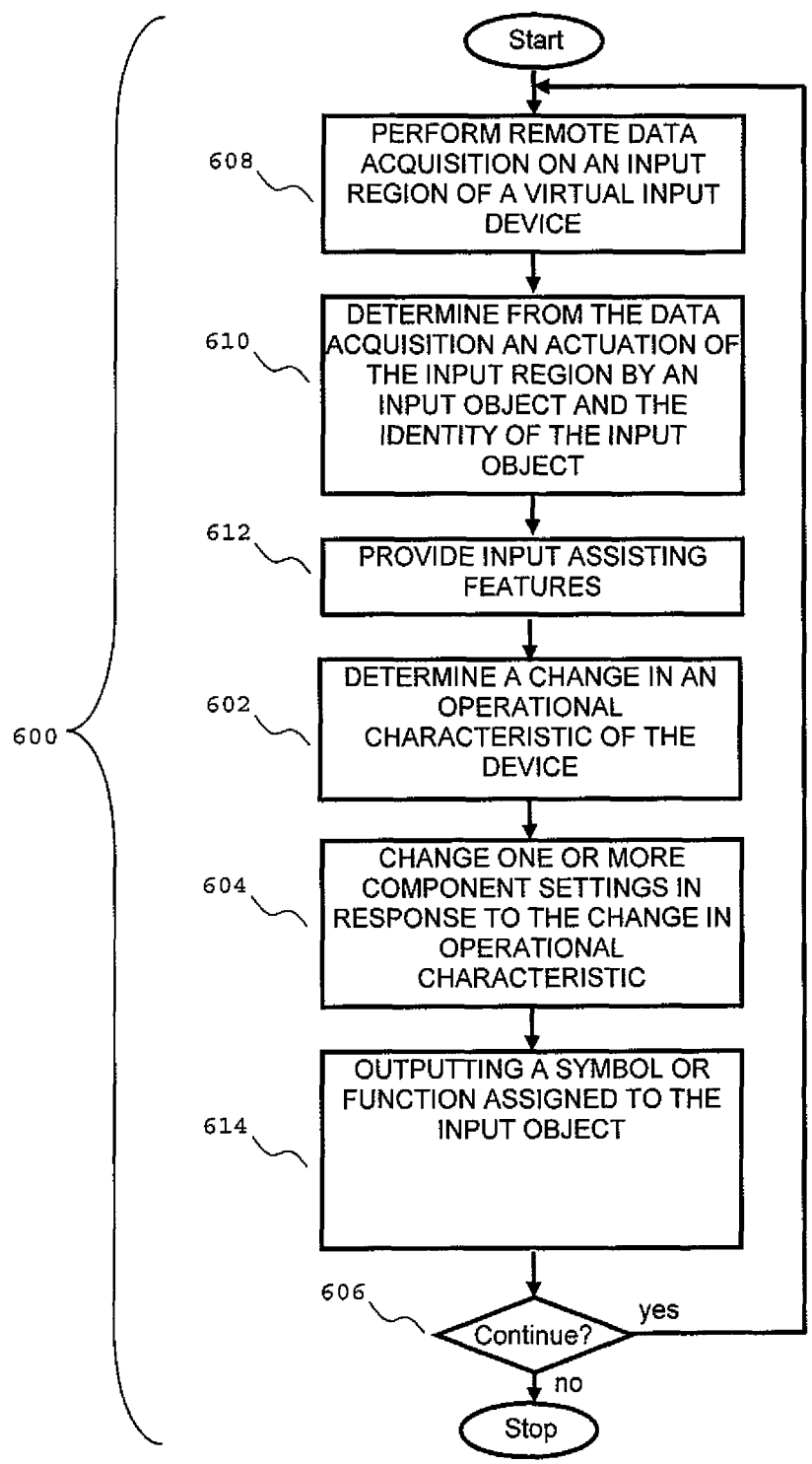
FIG. 6 illustrates a process for determining input symbols or functions of a virtual input device.
Figure 7:
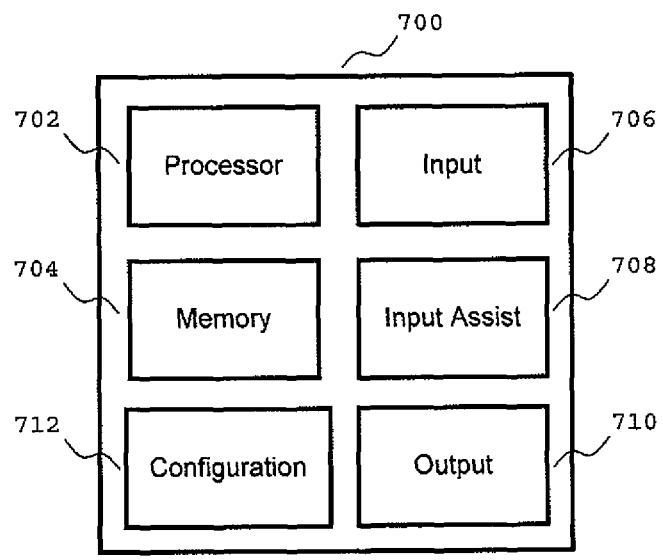
FIG. 7 illustrates a block diagram having components relating to one embodiment of a computer-implemented virtual input device.

FIG. 7 is a functional block diagram illustrating components relating to portions of one embodiment of a computer-implemented virtual input device 700, which incorporates actuating object identification technology to differentiate input objects during user input in accordance with the process 600 shown in FIG. 6. The virtual input device 700 is provided having a processor module 702, an associated memory module 704, an input module 706, an input assist module 708, an output module 710, and a configuration module 712. These modules may be coupled together directly or indirectly, such as through a data bus.

The processor module 702 executes program instructions, stored in memory module 704, including instructions relating to the underlying controlling software of the device 700, in response to virtual user input received through the input module 706. Such virtual user input is defined herein as any actuation of a remote input region associated with device 700 that causes the device to interpret a valid input. An input region is simply a pre-determined area in two-dimensional or three-dimensional space designated for user input. The location of the input region is typically fixed in relation to some reference point or object, such as a working surface, a face, a hand, a computing device, and so on. Some examples of input region actuation include, but not limited to: tapping finger(s) on an input region to signify a keystroke or mouse click, sliding finger(s) in an input region to signify mouse cursor movement, and fingers making particular gestures (e.g., extending index and middle fingers to form a "V" sign) within an input region to signify particular commands. Thus, virtual interfaces that require no tactile sensing mechanisms such as mechanical keys or a touch-sensitive surface may be provided within input regions to accept user input. Some examples of virtual interfaces include virtual keyboards, virtual phone keypads, virtual touchpads, virtual tablets etc. It is understood that virtual devices are often invisible, although an image of the device may be present on the input region to assist the user. For example, an image may be projected onto the input region using a laser or light emitting diode (LED). Alternatively, a paper bearing a printed image may be placed on the input region.

In a preferred configuration of the device 700, the input module 706 performs remote data acquisition, in step 608 of process 600, on the input region and sends the captured data to the processor module 702 for processing. Such remote data acquisition may be achieved, for example, utilizing one or more video capturing devices (e.g., video cameras). Upon remotely determining the user input from the input region in step 610, the processor module 702 may send the results to the output module 710 in step 614, to present the processed results to the user. The processed results, for example, may be presented to the user in the form of text, graphics, audio, video, or in some other forms of feedback or action, such as a device 700 engaging in communication with another device.

The input assist module 708, in step 612 of process 600, provides input assisting features during virtual input.

Examples of such input assisting features include, but not limited to: visual aides for a virtual interface in the form of illuminated guides projected on an input region (e.g., generated by laser or LED), illumination of the input region to compensate for poor lighting conditions (e.g., provided by a light source of the device), visual prompts on an output display, and audible cues such as various beeping sounds for alerting users.

The configuration module 712 facilitates in the configuration of various settings of components or modules in the virtual input device 700. This module may be implemented in software, hardware or combination of both. In software, configuration module 712 may simply consist of a set of program instructions. In hardware, configuration module 712 may be implemented as an application-specific integrated circuit (ASIC). Alternatively, configuration module 712 may be a general-purpose processor in device 700 that is dedicated for the purpose of facilitating the configuration of device component settings. For example, configuration module 712 may perform steps 602 and 604 of process 600 by executing program instructions stored in the memory module 704. In step 602, the configuration module 712 determines if a change in one or more operational characteristics of the device 700 has occurred. Upon a determination that such change(s) occurred, the configuration module automatically changes one or more corresponding component setting(s) of the device in step 604. If the processing continues in step 606, the process 600 is then repeated to determine additional inputs or functions. Otherwise, the operation may be terminated. The operational characteristics herein refer to any of the device's parameters, modes, and conditions of operation. Changes in the environmental operating conditions, such as changes in external lighting during user input, constitute one such example. Correspondingly, the configuration module 712 may automatically change, for instance, the settings of the input assist module 708 to provide adequate lighting.

It is worth noting that the input module 706, the output module 710 and the input assist module 708 may be provided as separate entities to a device 700 apart from a single physical unit. It should be observed that the apparatus components described herein have been represented where appropriate by conventional symbols in the drawings, showing only pertinent specific details so as not to obscure the disclosure with details that will be readily apparent to those of ordinary skill in the art having the benefit of the description herein. It is understood that the data entry device 700 may be provided in many different examples such as personal computers, personal digital assistants (PDAs), telephones, wireless telephones, remote controls, electronic musical instruments, control consoles of industrial or medical devices, and the like, or any other device whereby user input is received by the device for processing.

Figure 5:
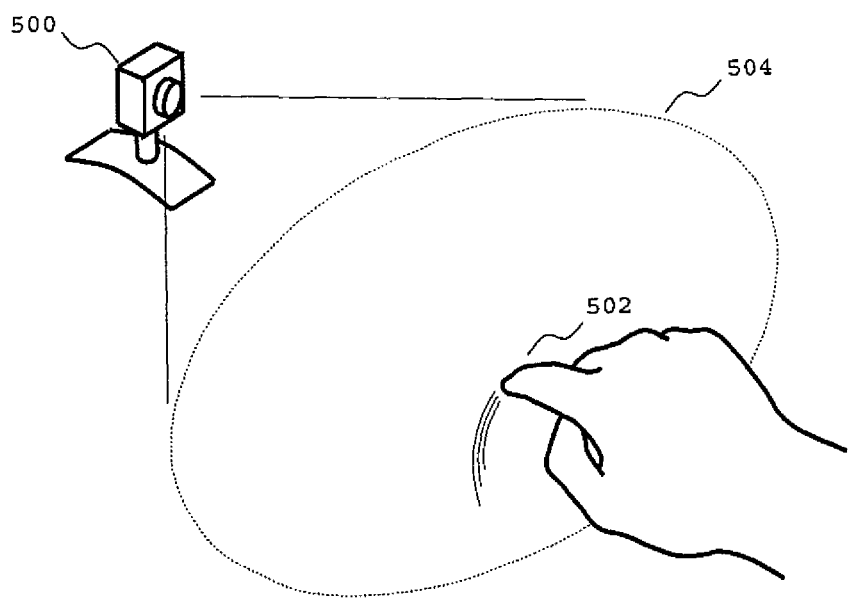
FIG. 5 depicts a virtual mouse interface.

In one exemplary form of the present invention, a virtual input device 700 incorporating actuating object identification technology to differentiate input objects may be used to process virtual mouse input, as illustrated in FIG. 5. The input module 706 may utilize one or more video data capturing devices, such as a video camera 500 in FIG. 5, to capture the motion information of input object(s), such as a user's finger 502, in an input region 504 on a surface that is within the view of the camera 500. The captured data is then processed by the device's processor module 702 to determine the corresponding mouse input. For example, actuation of the input region 504 in the form of a sliding motion made by a left index finger as shown in FIG. 5 may represent a corresponding mouse cursor movement, while the same motion made by a left middle finger may represent a "next" function for selecting items in a menu. As another example, mouse clicks may be achieved during input by tapping one or more particular fingers in the input region 504. Tapping the index finger of a left hand once may correspond to single clicking the left button on a conventional mouse, and tapping the same finger twice may correspond to double clicking the same button. However, tapping another finger, such as the middle finger of the left hand, or perhaps tapping both the index and middle fingers, may correspond to clicking the right button on a conventional mouse as the input objects are differentiated during input.

The processor module 702 executing actuating object identification program instructions may differentiate the input objects via certain features. For example, the size, shape, edge, vein pattern, nail color, skin texture, and skin tone are just some of the features that may be used to identify and differentiate the tapping fingers of a user, as disclosed in U.S. patent application Ser. No. 11/361,858 by Ling Su et al. The same patent application also describes methods and apparatus for capturing and processing input object motion and determining tapping events and locations.

Figure 1:
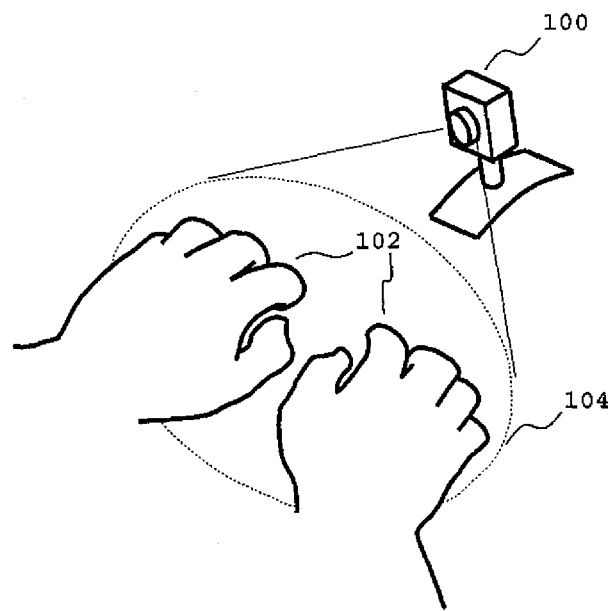
FIG. 1 illustrates a virtual interface for keyboard and mouse input provided by a data entry device that differentiates input objects.

In another exemplary form of the present invention, a virtual input device 700 incorporating actuating object identification technology to differentiate input objects may be used to process virtual keyboard input, as illustrated in FIG. 1. The input module 706 may utilize one or more video data capturing devices, such as a video camera 100 in FIG. 1, to capture the motion information of input object(s), such as a user's finger 102, in an input region 104 on a surface that is within the view of the camera 100. The captured data is then processed by the device's processor module 702 to determine the corresponding keyboard input.

Figure 3:
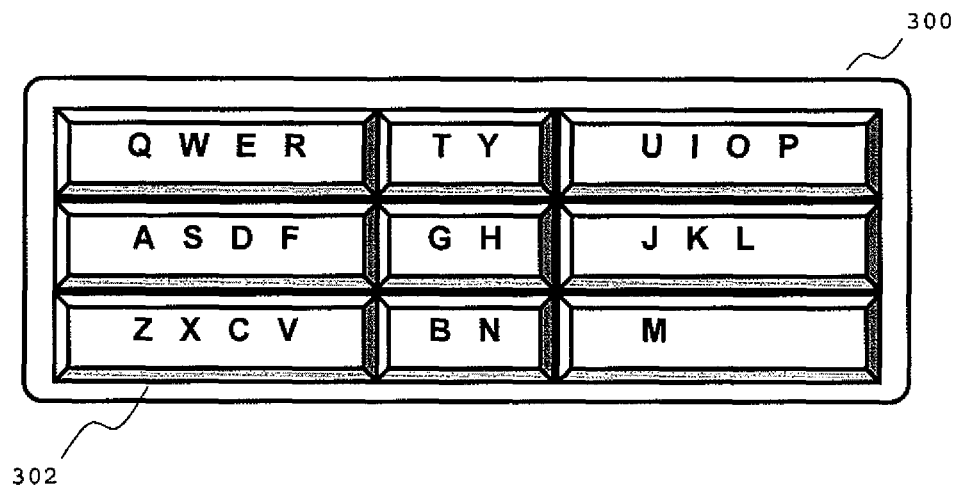
FIG. 3 illustrates a simulated keyboard that may be provided on-screen to users as a guide during input.
Figure 4:
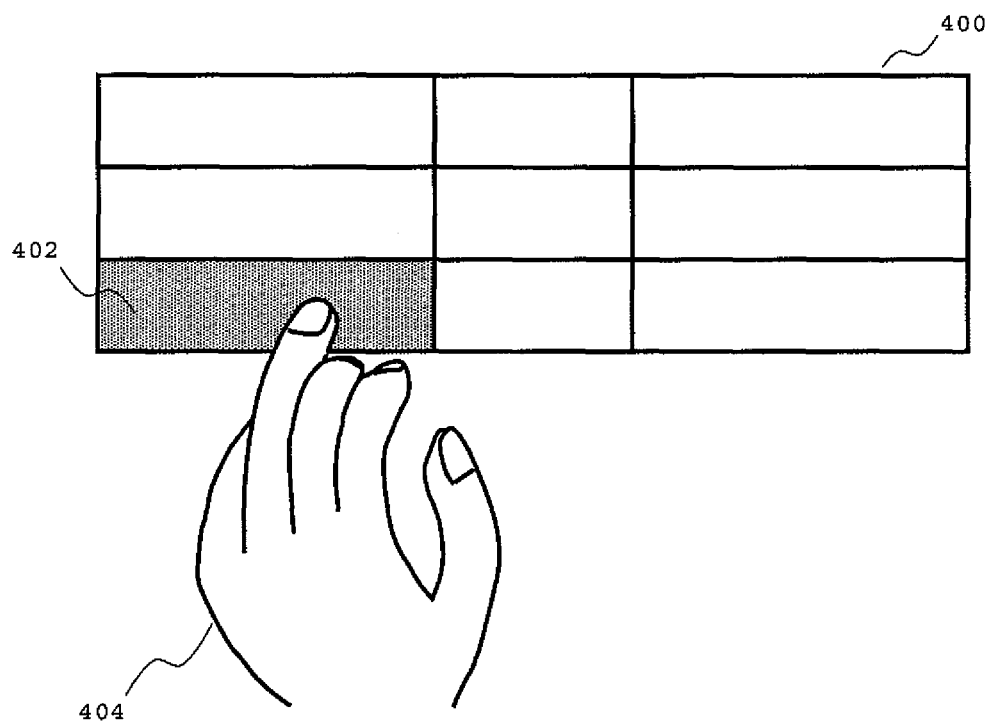
FIG. 4 depicts a reduced representation of the simulated keyboard shown in FIG. 3.

A virtual QWERTY keyboard interface 300 that is suited for touch typing input in the aforementioned data entry device is illustrated in FIG. 3. That is, keyboard interface 300 may be provided in input region 104 to accept touch typing input from a user. For clarity of illustration, only alphabetic symbols are shown in keyboard interface 300, it is understood that other symbols and functions, such as numeric symbols, may be provided by keyboard interface 300 in an alternative mode of operation. Compared to conventional QWERTY keyboards, key regions of keyboard interface such as 302 are generally longer and larger since keys associated with symbols or functions input by fingers on the same hand may be merged into a single key. The particular symbol or function on a merged key to be input during a keystroke is dependent on which finger is identified as the corresponding tapping finger by the processor module 702 executing actuating object identification program instructions. Thus, for example, if a ring finger from the fingers of a user's left hand 404, FIG. 4, is identified as striking key region 402 (shown in its corresponding representation as 302 in FIG. 3) having the symbols "Z", "X", "C", and "V", as then the corresponding input symbol determined is "X", since that is the symbol in key region 402 assigned to the left ring finger in accordance with conventional touch typing methods on a QWERTY keyboard. Precisely where within key region 402 is struck does not matter because it is the input object that determines the corresponding input symbol within a key region.

As mobile computing becomes ubiquitous, virtual input may find numerous practical applications in the mobile space. Since many mobile devices today are equipped with video cameras, these devices may be used to enable virtual input as described above.

For some mobile devices with built-in cameras, such those that use the 3G network, their cameras may be swiveled. This permits the camera to be pointed at the phone's user while carrying out a video conference with a remote party. Other phones may actually be equipped with two cameras, usually pointing in opposite directions. One of these cameras may be used for taking pictures while the other may be dedicated to video conferencing operations. These mobile devices may be easily adapted to perform virtual input based on differentiated objects.

Virtual input devices implemented in the aforementioned mobile devices may consist of components described with reference to FIG. 7. The appropriate configuration of these components can be critical to the device's operation, input accuracy, and usability. As an example, the swivel camera of a mobile device may need to be rotated to face the input area before input can be enabled. The component settings affected by this change in the operational characteristics of the device may include: camera focus, view angle, capture speed, exposure, etc.

While users may manually configure many of the settings of above components (e.g., turn on or off a feature under a specific condition) through software and/or hardware interface of the device, they will appreciate the convenience of automatic adjustment of many of the components and features based on common usage context such that some change(s) in the device's operational characteristics will trigger change(s) in other components and settings accordingly. The triggers may be initiated manually by users as they modify some operational characteristics of the device, such as activating a virtual input module, or automatically through the configuration module's detection of environmental or usage changes. The resultant changes to other settings may be determined based on users' prior selection, user behaviors, or a combination of these. For example, a user may rotate or pop up the camera to the input position (facing an input area), thus triggering the device's automatic adjustment of other features to prepare for an input session. The camera's focus range and view angle may be set for input. The actuating object identification software enabling differentiated object input would be initiated and camera capture speed, exposure level, and assisting lighting would be set for the input application based on existing lighting conditions. Visual or audio cues would also be automatically turned on or off based on the user's setting for an input application.

In many cases, default or customizable profiles could be used to define the trigger events or conditions and the associated changes and settings made to other features. That is, a combination of particular operational characteristics and particular component settings of said device may be grouped together as profiles. Users may select the profiles manually through a software or hardware user interface. The profiles may also be selected automatically by software during input according to usage or environmental conditions.

Figure 2:
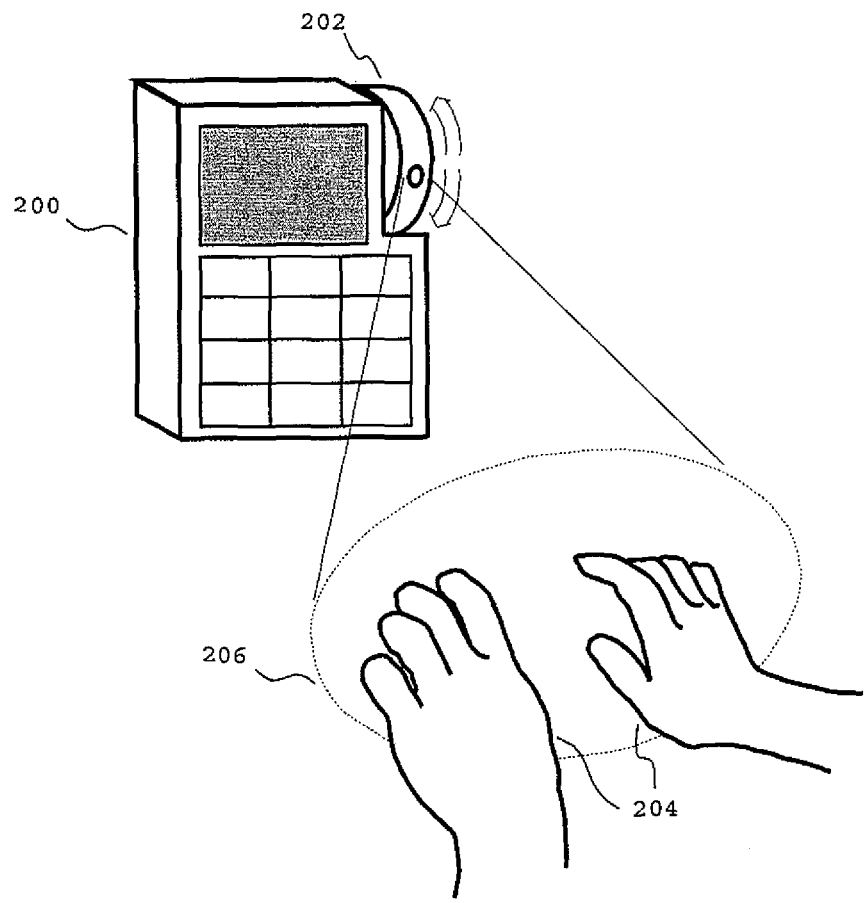
FIG. 2 depicts a mobile device equipped with a swivel camera.

Shown in FIG. 2 is a mobile device such as a smart phone 200 that is equipped with a swivel camera 202. During virtual input as depicted in FIG. 2, camera 202 must be pointed at the typing hands 204 so that they are within the camera's view 206. In a preferred form of the current invention, adjustment of the camera 202 to point to the typing hands 204 may be automated. This may be done, for example, by detecting the configuring of device 200 for input, such as the launching of a notepad application, text messaging application, spreadsheet application, and so on. Other possibilities may range from something as simple as selecting a function/option designated for input (e.g., pressing a button/key) to something more advanced such as making a certain gesture within the camera's view (e.g., posing a "V" sign using a right index and middle finger). In addition to swiveling the camera into position, actuating object identification and differentiation enabled software modules may be initiated automatically and other component settings associated with the camera that are pertinent to data entry operations may also be automatically set. As previously mentioned, these may include capture settings such as camera focus, view angle, and exposure, and assisting features such as turning on an LED light source as needed to providing additional lighting or projecting an illuminated keyboard interface on the working surface and silencing the audio cues if the "library" profile is currently selected. Conversely, a manual configuring of the camera 202 for data entry settings may trigger the device 200 to automatically switch into input mode by, for example, launching an input application such as text messaging and adjusting the aforementioned settings associated with input. Such manual configuring of camera 202 may include any of the adjustments such as: camera focus, view angle, exposure, and pointing direction. A switch or sensor may be embedded within the camera for such purposes so that switching the camera into input position may be conveniently detected and used for triggering adjustments in the corresponding component settings.

As previously indicated, some devices may be configured with two cameras that point in opposite directions, instead of a single swivel camera. In such instances, the methods of automatic camera and device configurations for virtual input as described with reference to FIG. 2 may be similarly applied. For example, configuration of such a device for input, such as the launching of a text messaging application or pressing a certain button, may automatically switch one of the cameras for capturing input (i.e., data entry) into operation, as well as setting associated camera parameters and configurations such as camera focus, view angle and exposure to values optimal for data entry. Likewise, a manual switching of the camera designated for capturing input into operation may trigger the device to automatically configure for data entry by, for example, launching an input application such as text messaging and configuring settings associated with input, similar to those mentioned previously. Users may also manually trigger the input function and associated settings through an on-screen soft key or hardware shortcut button.

The assisting visual cues mentioned previously may be provided in many ways. A detailed or simplified keyboard (or simply indicators of key positions) may be displayed, projected, or drawn on the input region. A certain gesture made with particular input fingers or activation of a hardware or on-screen key may be used to switch between different input modes of the keyboard interface. Similarly, the same may be applied to activate and de-active input assisting features, such as those provided by the input assist module 708. Examples of such input assisting features include: visual aides for a virtual interface in the form of illuminated guides projected on an input region (e.g., generated by laser or LED), illumination of the input region to compensate for poor lighting conditions (e.g., provided by a light source of the device), visual prompts on an output display, and audible cues such as various beeping sounds for alerting users.

As the lighting may be insufficient in some data entry environments, it may be useful to provide illumination in these situations, for example, via the use of LEDs or other light sources provided by the input assist module 708. Such light source(s) may be configured to automatically activate upon a determination that the lighting condition during input operations is inadequate, as carried out by configuration module 712. This may be achieved by monitoring the remote data acquired by a video capturing device, such as camera 100 in FIG. 1, or 202 in FIG. 2, used to capture input object information or one or more dedicated sensor(s) for this purpose (e.g., a photosensor).

During virtual input, it is important for the input objects, such as a user's fingers, to be within the view of the video camera that captures input information pertaining to the objects, such as finger movement and tapping location. Visual guides or cues may be provided to assist users in locating the camera's view area and/or virtual interface. In one preferred form of the present invention, such a visual guide may be provided in the form of a projection generated by a laser or LED light source. Projection of the laser or LED onto the typing surface in the form of a "dot" may be used to indicate, for example, the center of a virtual keyboard, which may be set to be midway between the "G" and "H" keys on a conventional QWERTY keyboard, or the "5" key on a phone keypad. The projected "dot" or point may also be used to indicate the center of a virtual touchpad for mouse input. In another preferred form of the present invention, the visual guide may be projected line onto the typing surface representing, for example, the middle row of alphabetic keys on a QWERTY style keyboard (i.e., the row of keys containing "A", "S", "D", etc.). This is the position that touch typists typically rest their hands when no keystroke is taking place, and thus serves as a reference position for the QWERTY style keyboard. The "5" key on a phone keypad may similarly serve as a reference position for other keys on the keypad.

For virtual input devices that differentiates input objects, a dot or a line indicating the middle row of a keyboard interface may be sufficient to enable efficient touch typing. This is apparent from FIG. 4 that there are only 3 rows of keys for alphabetic input in a keyboard interface for virtual input enabled with input object differentiation. Thus, the typing fingers on a user's hand need only to protrude forward and press down to access symbols or functions in the top row, press down in-place to access symbols or functions in the middle row, or pull back and press down to access symbols or functions in the bottom row. Accessing symbols such as "T", "Y", "G", etc. in the middle column will further require the index fingers to also protrude slightly to the left or right. Therefore, a dot or line that enables a hand to establish the middle row of keys as its initial position enables all the input symbols or functions to be input just as in touch typing. In yet another preferred form of the present invention, however, the visual guides may be more detailed, such as in the form of an illuminated outline of the key regions of a QWERTY style keyboard as shown in FIG. 4.

To conserve energy, which is especially important for mobile devices, the visual prompts or cues described above need not be shown during the entire duration of the data entry operation. For example, the visual guides may be automatically shown only briefly at the beginning of an input session to assist a user in positioning his input fingers. The visual prompts may also be shown automatically when input object(s) are detected within an input region. It may be useful, however, to briefly display visual guides when input object(s) are no longer detected within in an input region. This may serve to alert users that their input fingers or hands have wandered outside of the input region. Furthermore, the visual prompts may be manually activated, for example, by the user via pressing a button, using a particular gesture, or be automatically activated, for example, by the input device upon determining that an input session has been initiated such as via the launching of a text messaging application. The user may also activate the display of the guides by other means, such as making the "V" sign with a right index and middle finger, mentioned previously, within the input region. In addition, visual guides and audio cues may be, according to a user's settings, automatically disabled or switched to a simplified form (e.g., projecting only a dot at a certain time interval instead of projecting an entire keyboard interface). Users may select how long after the current input session begins, or after input hands or activities are not detected (idle time), the device will trigger those changes. Again, users may always re-activate a particular visual cue via an input gesture or software or hardware shortcut keys, as described above.

During virtual input, such as touch typing on a QWERTY style keyboard interface, a user's hands may drift over time as there are no physical keys underneath to restrict hand position. In such instances, it may be useful to have the visual guides displayed again, either briefly or permanently, as prompt to the user on where to position his hands. This may be performed automatically using alerting features when, for example, the input device's configuration module 712 determines from object information captured by the video camera that some portion of the user's hands are outside of the camera's view (or input region).

Figure 8:
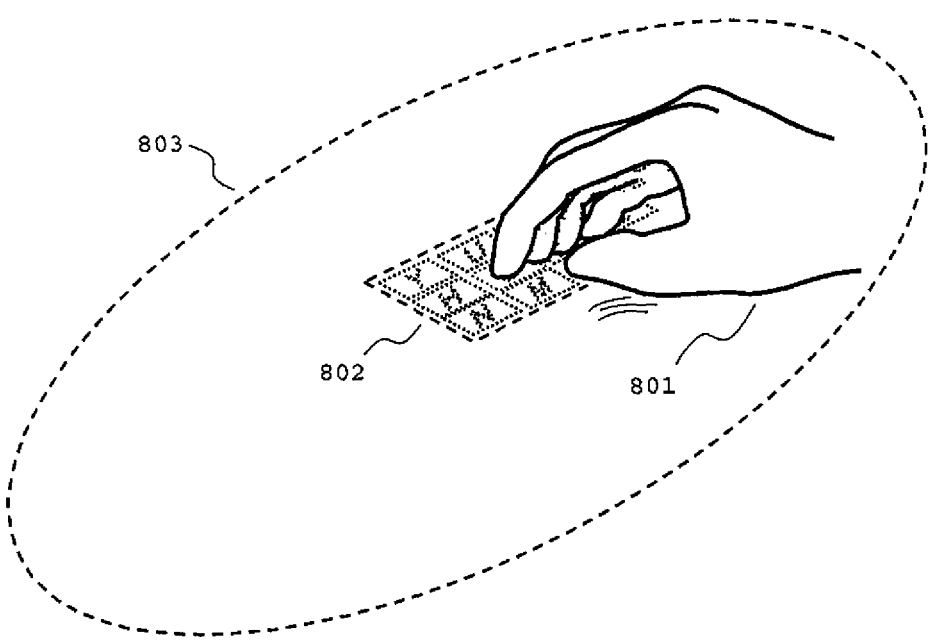
FIG. 8 illustrates a portion of a virtual keyboard that dynamically changes its location in relation to a reference.

Instead of having a fixed location, the position of a virtual keyboard interface within an input region may be adjusted dynamically in a fixed relation to a user's typing hands. More specifically, the position of a palm or knuckles of a hand may be set as a reference for the keyboard. This will allow greater accuracy and comfort during typing since users' hands may drift while typing on virtual keyboards. For better ergonomics, a QWERTY style keyboard may be further split into sections, such as a left half and a right half, wherein the location of each section may be each adjusted dynamically in a fixed relation to the corresponding palm or knuckles of a user's hand. This is depicted in FIG. 8. For clarity of illustration, only a right hand 801 and the right half 802 of a virtual QWERTY style keyboard in alphabetic input mode is shown within input region 803. It is understood that a keyboard section herein refers to a portion of a keyboard comprising one or more keys or key regions (i.e., the smallest functional unit of a keyboard).

When the location of a virtual keyboard interface changes dynamically in relation to some reference, such as the palm or knuckles of a user's hand(s), any illuminated guides of the keyboard interface projected onto an input region as an assisting feature must also change its location dynamically in relation to the same reference. This enables users to literally "see" the virtual keyboard interface, such as 802 of FIG. 8, and how it moves in unison with the reference palm(s) or knuckle(s) as they type.

Besides location, other characteristics of a virtual keyboard interface may be modified in response to changes in the states of its reference object. For example, rotating a user's hands may cause the orientation of the virtual keyboard interface to rotate accordingly. Other characteristics of a virtual keyboard interface that may be affected by state changes in a reference object such as a user's hand include: key region size, key region spacing, key region orientation, keyboard layout (e.g., QWERTY, phone, etc.), and keyboard size. As another example, key regions in a keyboard may be spaced farther apart when fingers on a typing hand are spread out. In this case, the knuckles of a finger may serve as reference tzar the key region locations. In addition, the key regions may become larger when bigger hands and fingers are detected within an input region. Likewise, the keyboard interface itself will also become larger. Conversely, a smaller keyboard interface with smaller key regions may be provided when smaller hands and fingers are detected.

When visual assisting features such as laser or LED projections of a keyboard interface are provided, the corresponding characteristics of the projections may also change in response to changes in the states of the interface's reference object. For example, rotating a user's hands may cause the orientation of the projected visual guides for a keyboard interface to rotate accordingly. As another example, key regions in the projected keyboard interface may be spaced farther apart when fingers on a typing hand are spread out. Again, the knuckles of a finger may serve as reference for the key region locations. In addition, the projected key regions may become larger when bigger hands are detected. A projection of a QWERTY style keyboard interface may be provided to assist input when both hands are in typing position in the input region, while a projection of a phone keypad layout of keys may be provided when only one of the user's hands is posed for typing.

Although the advantages of the aforementioned assisting features consisting of projected visual guides is apparent from the above discussion in the context of virtual input devices that differentiate input objects, those of ordinary skill in the art will appreciate that the same advantages are applicable to conventional virtual input devices that do not differentiate input objects.

While the present invention has been described above in terms of specific examples and embodiments with reference to the accompanying drawings, it is to be understood that the invention is not intended to be confined or limited to those precise embodiments disclosed herein. On the contrary, the present invention is intended to cover various structures and modifications. It should be clearly understood that many variations and/or modifications of the basic inventive concepts herein taught, which may appear to those skilled in the pertinent art, will still fill within the spirit and scope of the present invention. All such changes and modifications are intended to be included within the scope of the invention.

The invention claimed is:

1. A method of configuring component settings of a virtual input device having a virtual input region having a plurality key regions on a surface having no mechanical or touch-sensitive key structures for inputting associated symbols and functions, comprising:
   providing an input module in a position remote from the virtual input region and performing with the input module data acquisition of the virtual input region to determine the position of a unique input object from a group of unique input objects controlled by a user of the device;
   assigning to at least two key regions of the plurality of key regions two or more symbols or functions;
   assigning a unique input object to each of the two or more symbols or functions assigned to each of the at least two key regions;
   providing a processor and, with the processor:
      determining from the data acquisition an actuation of one of the at least two key regions to determine a struck key by one of the unique input objects, and
      identifying the unique input object from the group of unique input objects to determine a single symbol or function from the two or more symbols or functions associated with the struck key to determine a desired symbol or function for output;
   providing an input assist module and providing with the input assist module input assisting features;
   providing a configuration module and, with the configuration module:
      determining a change in an operational characteristic of the device; and
      changing one or more of the device's component settings in response to the step of determining of a change; and
   providing an output module and outputting with the output module the desired symbol or function.

2. A method as recited in claim 1, wherein said unique input objects comprise said user's fingers.

3. A method as recited in claim 1, wherein said operational characteristic includes environmental operating conditions of the device.

4. A method as recited in claim 1, wherein the change in an operational characteristic of the device comprises a user-initiated configuration of at least one component setting of the device, said user-initiated configuration includes one or more of: (a) launching an input software application, (b) making a particular gesture within the input region using at least one input object, and (c) selecting a profile comprising a combination of particular operational characteristics and particular component settings of said device.

5. A method as recited in claim 1, wherein the change in an operational characteristic of the device comprises a user-initiated configuration of a swivel video capturing device coupled to the virtual input device as the input module, said user-initiated configuration includes one or more of: (a) rotating said video capturing device, (b) adjusting the focus of said video capturing device, (c) adjusting the view angle of said video capturing device, and (d) adjusting the pointing of said video capturing device.

6. A method as recited in claim 1, wherein said component settings of the device include one or more of: (a) focus of a video capturing device coupled to the device as the input module, (b) view angle of a video capturing device coupled to the device as the input module, (c) pointing of a video capturing device coupled to the device as the input module, and (d) activation of the input module coupled to the device.

7. A method as recited in claim 1, wherein changing said component settings of the device include the activation or de-activation of at least one input assisting feature of the input assist module.

8. A method as recited in claim 7, wherein the step of determining a change in an operational characteristic of the device comprises determining from the data acquisition a gesture made with at least one input object to activate or de-activate said input assisting feature.

9. A method as recited in claim 7, wherein said input assisting feature includes illumination of the input region provided by a light source of the device.

10. A method as recited in claim 9, wherein the step of determining a change in an operational characteristic of the device comprises determining a change in the device's environmental lighting conditions during operation, and wherein the step of changing one or more of the component settings comprises activating or de-activating said light source of the device.

11. A method as recited in claim 1, wherein said input module further provides a keyboard interface in the virtual input region for user input, and wherein said keyboard interface is divided into sections, and further wherein the step of changing one or more component settings comprises dynamically modifying the characteristics of the individual sections of the keyboard interface in response to a change in the state of at least one reference object as determined from the data acquisition.

12. A method as recited in claim 11, wherein the step of dynamically modifying the characteristics of said individual sections of the keyboard interface comprises dynamically modifying the location of a keyboard section in response to a change in the location of the user's reference palm or knuckles.

13. A method as recited in claim 11, wherein the step of dynamically modifying the characteristics of said individual sections of the keyboard interface comprises dynamically modifying the orientation of a keyboard section in response to a change in the orientation of the user's reference palm or knuckles.

14. A method as recited in claim 11, wherein the step of dynamically modifying the characteristics of said individual sections of the keyboard interface comprises dynamically modifying one or more of:
   spacing between key regions in a keyboard section; and
   size of a keyboard section;
   in response to a change in one or more of:
   spread of the user's reference finger;
   size of the user's reference hand; and
   size of the user's reference finger.

15. A method as recited in claim 1, wherein said input assisting feature includes projecting from the input assist module an illuminated visual guide in the virtual input region.

16. A method as recited in claim 15, wherein said visual guide includes one or more of: (a) an illuminated point in the virtual input region to indicate the center of a virtual input interface, (b) an illuminated line in the virtual input region to indicate the center row of a virtual keyboard interface, and (c) an illuminated outline in the virtual input region to indicate the boundaries of a virtual input interface.

17. A method as recited in claim 15, wherein said visual guide comprise an illuminated virtual keyboard interface, and further wherein the step of changing one or more component settings comprises modifying dynamically the location of said keyboard interface in response to a change in the location of the user's reference palm or knuckles.

18. A method as recited in claim 15, wherein said visual guide comprise an illuminated virtual keyboard interface, and further wherein the step of changing one or more component settings comprises modifying dynamically the orientation of said keyboard interface in response to a change in the orientation of the user's reference palm or knuckles.

19. A method as recited in claim 15, wherein said visual guide comprise an illuminated virtual keyboard interface, and further wherein the step of changing one or more component settings comprises modifying dynamically one or more of:
   spacing between key regions in the keyboard interface; and
   size of the keyboard interface;
   in response to a change in one or more of:
   spread of the user's reference finger;
   size of the user's reference hand; and
   size of the user's reference finger.

20. A method as recited in claim 1, wherein the step of changing one or more component settings comprises one or more of: (a) automatically disabling at least one assisting feature after a period of time; (b) enabling or disabling at least one assisting feature upon detecting within the input region a particular gesture made with an input object; (c) enabling at least one assisting feature when an input object is detected within the input region; and (d) briefly enabling at least one assisting feature when input objects are no longer detected within the input region.

21. A method as recited in claim 20, wherein said assisting features comprise at least one of: (a) illumination of the input region provided by a light source of the device, and (b) illuminated visual guide for a virtual input interface projected in the input region.

22. An apparatus for configuring component settings of a virtual input device having a virtual input region having a plurality of key regions on a surface having no mechanical or touch-sensitive key structures, comprising:

a memory module adapted to store information associating at least two different input symbols or functions with each of two key regions of the plurality of key regions, wherein each of the at least two different symbols or functions associated with each of the two key regions are individually assigned to a unique input object from a group of unique input objects controlled by a user of the device;
   an input module adapted to perform remote data acquisition of the virtual input region to determine the position of input objects in the virtual input region;
   a processor adapted to determine from the data acquisition an actuation of one of the at least two key regions to determine a struck key;
      determine a single symbol or function from the two or more symbols or functions associated with the struck key to determine a desired symbol or function for output;
   an input assist module adapted to provide input assisting features;
   a configuration module adapted to determine a change in an operational characteristic of the device and to change one or more of the device's component settings in response to the change determined; and
   an output module adapted to output the desired symbol or function.

23. An apparatus as recited in claim 22, wherein said input objects comprise said user's fingers.

24. An apparatus as recited in claim 22, wherein said operational characteristic includes environmental operating conditions of the device.

25. An apparatus as recited in claim 22, wherein the change in an operational characteristic of the device comprises a user-initiated configuration of at least one component setting of the device, said user-initiated configuration includes one or more of: (a) launching an input software application, (b) making a particular gesture within the input region using at least one input object, and (c) selecting a profile comprising a combination of particular operational characteristics and particular component settings of said device.

26. An apparatus as recited in claim 22, wherein the change in an operational characteristic of the device comprises a user-initiated configuration of a swivel video capturing device coupled to the virtual input device as the input module, said user-initiated configuration includes one or more of: (a) rotating said video capturing device, (b) adjusting the focus of said video capturing device, (c) adjusting the view angle of said video capturing device, and (d) adjusting the pointing of said video capturing device.

27. An apparatus as recited in claim 22, wherein said component settings of the device include one or more of: (a) focus of a video capturing device coupled to the device as the input module, (b) view angle of a video capturing device coupled to the device as the input module, (c) pointing of a video capturing device coupled to the device as the input module, and (d) activation of the input module coupled to the device.

28. An apparatus as recited in claim 22, wherein said configuration module is adapted to change one or more of the component settings by activating or de-activating at least one input assisting feature of the input assist module.

29. An apparatus as recited in claim 28, wherein the configuration module is adapted to determine a change in an operational characteristic by determining from the data acquisition a gesture made with at least one input object to activate or de-activate said input assisting feature.

30. An apparatus as recited in claim 28, wherein said input assisting feature includes illumination of the input region provided by a light source of the device.

31. An apparatus as recited in claim 30, wherein the configuration module is adapted to determine a change in an operational characteristic and to change one or more of the component settings by determining a change in the device's environmental lighting conditions during operation and activating or de-activating said light source of the device in response.

32. An apparatus as recited in claim 22, wherein said input module is further adapted to provide a keyboard interface in the virtual input region for user input, and wherein said keyboard interface is divided into sections, and further wherein the configuration module is adapted to change one or more of the component settings by dynamically modifying the characteristics of the individual sections of the keyboard interface in response to a change in the state of at least one reference object as determined from the data acquisition.

33. An apparatus as recited in claim 32, wherein the configuration module modifies the characteristics of said individual sections of the keyboard interface by dynamically modifying the location of a keyboard section in response to a change in the location of the user's reference palm or knuckles.

34. An apparatus as recited in claim 32, wherein the configuration module modifies the characteristics of said individual sections of the keyboard interface by dynamically modifying the orientation of a keyboard section in response to a change in the orientation of the user's reference palm or knuckles.

35. An apparatus as recited in claim 32, wherein the configuration module dynamically modifies the characteristics of said individual sections of the keyboard interface by dynamically modifying one or more of:
spacing between key regions in a keyboard section; and
size of a keyboard section;
in response to a change in one or more of:
spread of the user's reference finger;
size of the user's reference hand; and
size of the user's reference finger.

36. An apparatus as recited in claim 32, wherein said input assisting feature includes projecting from the input assist module an illuminated visual guide in the virtual input region.

37. An apparatus as recited in claim 36, wherein said visual guide includes one of: (a) an illuminated point in the input region to indicate the center of a virtual input interface, (b) an illuminated line in the input region to indicate the center row of a virtual keyboard interface, and (c) an illuminated outline in the input region to indicate the boundaries of a virtual input interface.

38. An apparatus as recited in claim 36, wherein said visual guide comprise an illuminated virtual keyboard interface, and further wherein the configuration module is adapted to modify one or more component settings by modifying dynamically the location of said keyboard interface in response to a change in the location of a user's reference palm or knuckles.

39. An apparatus as recited in claim 36, wherein said visual guide comprise an illuminated virtual keyboard interface, and further wherein the configuration module is adapted to modify one or more component settings by modifying dynamically the orientation of said keyboard interface in response to a change in the orientation of a user's reference palm or knuckles.

40. An apparatus as recited in claim 36, wherein said visual guide comprise an illuminated virtual keyboard interface, and further wherein the configuration module is adapted to modify one or more component settings by modifying dynamically one or more of:
spacing between key regions in the keyboard interface; and
size of the keyboard interface;
in response to a change in one or more of:
spread of the user's reference finger;
size of the user's reference hand; and
size of the user's reference finger.

41. An apparatus as recited in claim 22, wherein the configuration module is adapted to change one or more component settings by: (a) automatically disabling at least one assisting feature after a period of time; (b) enabling or disabling at least one assisting feature upon detecting within the input region a particular gesture made with an input object; (c) enabling at least one assisting feature when an input object is detected within the input region; and (d) briefly enabling at least one assisting feature when input objects are no longer detected within the input region.

42. An apparatus as recited in claim 41, wherein said assisting features comprise at least one of: (a) illumination of the input region provided by a light source of the device, and (b) illuminated visual guide for a virtual input interface projected in the input region.

* * * * *